United States Patent
Comte et al.

(10) Patent No.: US 7,476,633 B2
(45) Date of Patent: Jan. 13, 2009

(54) β-SPODUMENE GLASS-CERAMIC MATERIALS AND PROCESS FOR MAKING THE SAME

(75) Inventors: Marie Jacqueline Monique Comte, Fontenay aux Roses (FR); Philippe Lehuede, Yerres (FR); Ronald Leroy Stewart, Elmira, NY (US)

(73) Assignee: Eurokera, Chierry (FR)

( * ) Notice: Subject to any disclaimer, the term of this patent is extended or adjusted under 35 U.S.C. 154(b) by 71 days.

(21) Appl. No.: 11/708,810

(22) Filed: Feb. 21, 2007

(65) Prior Publication Data

US 2007/0213192 A1 Sep. 13, 2007

(51) Int. Cl.
C03C 10/12 (2006.01)
C03C 10/14 (2006.01)
(52) U.S. Cl. .................. 501/7; 501/4; 65/33.8
(58) Field of Classification Search .......... 501/4, 501/7; 65/33.8
See application file for complete search history.

(56) References Cited

U.S. PATENT DOCUMENTS

| | | | | |
|---|---|---|---|---|
| 3,499,773 | A | | 3/1970 | Petticrew ............ 106/39 |
| 4,192,665 | A | * | 3/1980 | Chyung et al. ........ 65/33.8 |
| 4,212,678 | A | | 7/1980 | Chyung ............ 106/39.7 |
| 5,173,453 | A | | 12/1992 | Beall ................. 501/4 |
| 7,091,141 | B2 | * | 8/2006 | Horsfall et al. ......... 501/4 |
| 7,199,066 | B2 | * | 4/2007 | Horsfall et al. ........ 501/67 |
| 2004/0198579 | A1 | * | 10/2004 | Horsfall et al. ......... 501/4 |
| 2006/0084561 | A1 | * | 4/2006 | Horsfall et al. ......... 501/7 |
| 2006/0160689 | A1 | * | 7/2006 | Hsu et al. ............ 501/7 |

2007/0129231 A1 6/2007 Comte

FOREIGN PATENT DOCUMENTS

JP 61053131 A 3/1986
JP 2002154840 * 5/2002

* cited by examiner

Primary Examiner—Karl E Group
(74) Attorney, Agent, or Firm—Siwen Chen; Michael W. Russell

(57) ABSTRACT

The present invention relates to glass-ceramic materials, processes for making the same and articles comprising the same. The glass-ceramic material has a composition, by weight of the total composition, comprising 55-68% $SiO_2$; 18-24% $Al_2O_3$; 3.3-4.1% $Li_2O$; 1.5-4.0% ZnO; 1.5-5.0% MgO; 2-5% $TiO_2$; 0-2% $ZrO_2$; 0-5% $B_2O_3$; 0-8% $P_2O_5$; 0-2% $Na_2O$, 0-2% $K_2O$; and at least one component resulting from an effective amount of at least one fining agent; wherein: the total of $B_2O_3$ and $P_2O_5$ is at least 1.5% by weight, the total of MgO and ZnO is at least about 3.5% by weight, the total of $Na_2O$ and $K_2O$ is less than about 3.0% by weight, the total of $P_2O_5$, $B_2O_3$, $Na_2O$ and $K_2O$ is less than about 11% by weight, the weight ratio of the sum total of $Na_2O+K_2O$ to the sum total of $P_2O_5+B_2O_3$ $$\left(\frac{Na_2O + K_2O}{B_2O_3 + P_2O_5}\right)$$

is less than about 0.5; advantageously the total of $P_2O_5$, $B_2O_3$, $Na_2O$ and $K_2O$ is less than about 9% by weight and the total of $Na_2O$ ad $K_2O$ is less than about 2% by weight; and more advantageously the total of $P_2O_5$, $B_2O_3$, $Na_2O$ and $K_2O$ is less than about 7% by weight and the total of $Na_2O$ ad $K_2O$ is less than about 1% by weight. The glass-ceramic material comprises β-spodumene solid solution as the predominant crystalline phase.

20 Claims, No Drawings

β-SPODUMENE GLASS-CERAMIC MATERIALS AND PROCESS FOR MAKING THE SAME

FIELD OF THE INVENTION

The present invention relates to glass-ceramic material, process for making the same and articles comprising the same. In particular, the present invention relates to glass-ceramic material comprising β-spodumene solid solution as the predominant crystalline phase, process for making the same and articles comprising the same. The present invention can be used, for example, in the manufacture of glass-ceramic cooktop plates and cooking utensils.

BACKGROUND OF THE INVENTION

Glass-ceramic materials have been used widely in various applications. For example, glass-ceramic cooktop plates and cooking utensils, such as bowls, dinner plates, and the like, are used widely in modern kitchens. Transparent glass-ceramic materials have been used in the production of stove and/or furnace windows, optical elements, mirror substrates and the like. Glass-ceramic materials are typically made from ceramming their precursor glass materials at elevated temperatures for specified periods of time. Two categories of glass-ceramic materials based on $SiO_2$—$Al_2O_3$—$Li_2O$ glass system are those comprising β-quartz solid solution as the predominant crystalline phase and those comprising β-spodumene solid solution as the predominant crystalline phase. These two categories of glass-ceramic material can be produced from the same precursor glass material. Cooktop plates made of both types of glass-ceramic materials are available commercially.

One example of β-spodumene glass-ceramic material-based cooktop plate is Kerawhite® available from Eurokera. This plate has the advantages of relatively low coefficient of thermal expansion from about room temperature to about 700° C. and an appealing, clean, milky-white color. It has been accepted by a large volume of consumers in different markets.

After the commercial success of Kerawhite®, it was perceived that a more economical glass-ceramic material yet capable of being melted at a lower temperature would be desirable. The material may be translucent. For cooktops to be used with induction cooking, there is a special interest in opaque glass-ceramic material which can make the inductive heating elements invisible to the eyes.

It is known that when melting the precursor glass of any glass-ceramic material, fining agents are usually required in order to reduce the seed count in the glass. Common fining agents used include $As_2O_3$, $Sb_2O_3$, and the like. These oxides are batched as $As_2O_5$, $Sb_2O_5$ or oxidized into $As_2O_5$ and $Sb_2O_5$ before the glass melt is heated to the fining temperature, when they dissociate to release $O_2$. The released $O_2$ helps to reduce the bubble count in the glass melt. For environmental reasons, it is highly desired that the melting of the precursor glass does not require the use of such toxic fining agents.

It is not always straightforward in finding a replacement for the $As_2O_3$ and/or $Sb_2O_3$ fining agents when melting a particular glass. Different fining agents have differing fining capacity and usually require differing fining temperature ranges. Using a different fining agent can lead to the risks of requiring increased fining temperature and/or devitrification temperature of the glass melt. Increased devitrification temperature of glass usually means that the glass must be formed or processed at higher temperature in order to avoid devitrification thereof, which is highly undesirable.

Glass-ceramic material has been the subject of research and product development for decades. For example, a relative recent product development involving this material is the lamp reflector substrate used in modern projection display systems where high-power, high temperature, high-intensity discharge lamps are employed. Preferred lamps for projection displays comprise a high intensity arc discharge lamp positioned within a reflective structure to produce a high intensity light beam. Particularly for digital data projectors and digital projection large screen televisions, these lamps require a high temperature stable reflector. WO 2004/094327 discloses a glass-ceramic lamp reflector substrate. However, the glass-ceramic material for use in this product as disclosed in this reference requires the predominant crystalline phase of the material to be β-quartz in order to obtain high dimensional stability and low coefficient of thermal expansion. Moreover, there was no specific example in this reference where the precursor glass of the glass-ceramic material was fined without the use of $As_2O_3$ and/or $Sb_2O_3$.

It is generally known that if a precursor glass can be cerammed into glass-ceramic materials comprising β-quartz or β-spodumene solid solution as the predominant crystalline phases, the production of the latter usually entails a higher ceramming temperature. This means higher energy consumption, especially where prolonged ceramming cycle at such high temperature is required. Certain commercial products of β-spodumene-based glass-ceramic materials were produced by ceramming at temperatures higher than 1050° C. and for as long as over 100 minutes. Such prolonged, high temperature ceramming requires the use of high temperature-resistant, high-power ceramming kilns for their manufacture. Thus, it is highly desirable that the glass-ceramic material comprising β-spodumene solid solution as the predominant crystalline phase can be produced in a relatively short and/or relatively low temperature ceramming cycle.

There is a genuine need of a glass-ceramic material, advantageously opaque, comprising β-spodumene solid solution as the predominant crystalline phase, that is capable of being melted at a relatively lower melting temperature, such as below 1600° C., and be converted to glass-ceramics by a short ceramming thermal treatment at a relatively low temperature, such as below 1050° C.

SUMMARY OF THE INVENTION

According to one aspect of the present invention, provided is a glass-ceramic material having β-spodumene solid solution as the predominant crystalline phase, a coefficient of thermal expansion (CTE) from about 25 to about 700° C. of about $10-30\times10^{-7}/°$ C., and a composition, by weight of the total composition, comprising 55-68% $SiO_2$; 18-24% $Al_2O_3$; 3.3-4.1% $Li_2O$; 1.5-4.0% ZnO; 1.5-5.0% MgO; 2-5% $TiO_2$; 0-2% $ZrO_2$; 0-5% $B_2O_3$; 0-8% $P_2O_5$; 0-2% $Na_2O$, 0-2% $K_2O$; and at least one component resulting from an effective amount of at least one fining agent; wherein: the total of $B_2O_3$ and $P_2O_5$ is at least 1.5% by weight, the total of MgO and ZnO is at least about 3.5% by weight, the total of $Na_2O$ and $K_2O$ is less than about 3.0% by weight, the total of $P_2O_5$, $B_2O_3$, $Na_2O$ and $K_2O$ is less than about 11% by weight, the weight ratio of the sum total of $Na_2O+K_2O$ to the sum total of $P_2O_5+B_2O_3$ $$\left(\frac{Na_2O + K_2O}{B_2O_3 + P_2O_5}\right)$$

is less than about 0.5; advantageously the total of $P_2O_5$, $B_2O_3$, $Na_2O$ and $K_2O$ is less than about 9% by weight and the total of $Na_2O$ ad $K_2O$ is less than about 2% by weight; and more advantageously the total of $P_2O_5$, $B_2O_3$, $Na_2O$ and $K_2O$ is less than about 7% by weight and the total of $Na_2O$ ad $K_2O$ is less than about 1% by weight.

In certain embodiments, the glass-ceramic material of the present invention is essentially opaque. In certain embodiments, the glass-ceramic material of the present invention is translucent.

In certain other embodiments, the glass-ceramic material of the present invention has a lightness L* higher than about 89%.

In certain embodiments, the glass-ceramic material of the present invention has a CTE of about $10\text{-}25\times10^{-7}/°$ C. between about 20° C. and about 700° C. In certain other embodiments of the glass-ceramic material of the present invention, it has a CTE from about 25° C. to about 700° C. of about $10\text{-}20\times10^{-7}/°$ C.

In certain embodiments, the glass-ceramic material of the present invention comprises about 0.3-1.2% by weight of $SnO_2$, more advantageously 0.3-0.8% and 0-1% by weight of $CeO_2$ as fining agents. In these embodiments, it is further preferred that the glass is essentially free of $As_2O_3$ and $Sb_2O_3$ as fining agents.

In certain embodiments of the glass-ceramic material of the present invention, the material is essentially white. In other embodiments, the glass-ceramic material of the present invention can be colored as well.

In certain other embodiments of the glass-ceramic material of the present invention, it comprises a total of $P_2O_5$ and $B_2O_3$ of higher than or equal to about 2% by weight.

In certain embodiments of the glass-ceramic material of the present invention, it comprises $Li_2O$ in the amount between about 3.5-4.1% by weight.

A second aspect of the present invention is glass-ceramic articles made of the glass-ceramic material of the present invention described summarily above and in detail below. In certain embodiments, the glass-ceramic articles of the present invention are cooktop plates and/or cooking utensils. In certain embodiments, especially where they are cooktop plates and cooking utensils, the article is made of glass-ceramic material of the present invention that is essentially free of $As_2O_3$ and $Sb_2O_3$ as fining agents.

In another aspect of the present invention, it is provided a process for making glass-ceramic articles, comprising the following steps:

(i) mixing raw materials in amounts such that upon melting thereof a glass is produced of a composition by weight of the total glass composition, comprising 55-68% $SiO_2$; 18-24% $Al_2O_3$; 3.3-4.1% $Li_2O$; 1.5-4.0% ZnO; 1.5-5.0% MgO; 2-5% $TiO_2$; 0-2% $ZrO_2$; 0-5% $B_2O_3$; 0-8% $P_2O_5$; 0-2% $Na_2O$, 0-2% $K_2O$; and at least one fining agent; wherein: the total of $B_2O_3$ and $P_2O_5$ is at least 1.5% by weight, the total of MgO and ZnO is at least about 3.5% by weight, the total of $Na_2O$ and $K_2O$ is less than about 3.0% by weight, the total of $P_2O_5$, $B_2O_3$, $Na_2O$ and $K_2O$ is less than about 11% by weight, the weight ratio of the sum total of $Na_2O+K_2O$ to the sum total of $P_2O_5+B_2O_3$ $$\left(\frac{Na_2O + K_2O}{B_2O_3 + P_2O_5}\right)$$

is less than about 0.5; advantageously the total of $P_2O_5$, $B_2O_3$, $Na_2O$ and $K_2O$ is less than about 9% by weight and the total of $Na_2O$ ad $K_2O$ is less than about 2% by weight; and more advantageously the total of $P_2O_5$, $B_2O_3$, $Na_2O$ and $K_2O$ is less than about 7% by weight and the total of $Na_2O$ ad $K_2O$ is less than about 1% by weight;

(ii) melting and fining the mixture of raw materials at temperature below about 1600° C.;

(iii) forming the melted glass of step (ii) into glass articles;

(iv) heating the glass articles to a nucleating temperature range $T_n$ between 600 and 850° C. for at least 15 minutes;

(v) heating the glass articles to a ceramming temperature $T_c$ between 900 and 1050° C.;

(vi) maintaining the articles at the ceramming temperature for a period of time over 10 minutes; and (vii) cooling the articles to room temperature; whereby a glass-ceramic article comprising β-spodumene solid solution as the predominant crystalline phase is produced. The glass-ceramic material may be opaque or translucent.

In certain embodiments of the process of the present invention, in step (ii), the mixture of the raw materials is melted and fined at a temperature up to about 1550° C.

In certain embodiments of the process of the present invention, in step (i), the raw materials mixed comprises about 0.3-1.2% by weight of $SnO_2$, advantageously 0.3-0.8% and 0-1% $CeO_2$ of the final total composition of the melted glass, and essentially free of $As_2O_3$ and $Sb_2O_3$.

In certain other embodiments of the process of the present invention, in step (i), the raw materials mixed comprises a total of $B_2O_3$ and $P_2O_5$ of higher than or equal to about 2% by weight of the final total composition of the melted glass.

In certain other embodiments of the process of the present invention, in step (v), the temperature $T_c$ is between about 930-1000° C.

In certain other embodiments of the process of the present invention, the duration of step (v) is less than 1 hour.

In certain embodiments of the process of the present invention, the total of the duration of steps (iv), (v) and (vi) is less than 2 hours, in certain embodiments shorter than about 90 minutes.

The present invention has the advantage that the glass-ceramic material and glass-ceramic article of the present invention can be produced by melting and fining the glass at a low temperature, typically below 1600° C., and cerammed into the glass-ceramic material of the present invention at a relatively low ceramming temperature for a relatively short duration.

Additional features and advantages of the invention will be set forth in the detailed description which follows, and in part will be readily apparent to those skilled in the art from the description or recognized by practicing the invention as described in the written description and claims hereof.

It is to be understood that the foregoing general description and the following detailed description are merely exemplary of the invention, and are intended to provide an overview or framework to understanding the nature and character of the invention as it is claimed.

DETAILED DESCRIPTION OF THE INVENTION

As used herein, the term "essentially white" means that the glass-ceramic material of the present invention has a level of lightness higher than 89% in the CIELAB colorimetric system and an a* and b* values between −1.5 and 1.5 with illuminant D65.

As used herein, the term "essentially free of $As_2O_3$ and $Sb_2O_3$" means that the glass or glass-ceramic of the present invention comprises less than about 0.1% by weight of either of $As_2O_3$ or $Sb_2O_3$.

As used herein, the term "having β-spodumene solid solution as the predominant crystalline phase" means that β-spodumene solid solution constitutes higher than about 50% by volume of the all the crystalline phases in the glass-ceramic material of the present invention. Other crystalline phase in the glass-ceramic material of the present invention may include: β-quartz, β-eucryptite, spinel and the like.

The glass-ceramic material of the present invention comprises, expressed in terms of weight percentage: 55-68% $SiO_2$; 18-24% $Al_2O_3$; 3.3-4.1% $Li_2O$; 1.5-4.0% ZnO; 1.5-5.0% MgO; 2-5% $TiO_2$; 0-2% $ZrO_2$; 0-5% $B_2O_3$; 0-8% $P_2O_5$; 0-2% $Na_2O$, 0-2% $K_2O$; and at least one component resulting from an effective amount of at least one fining agent, such as $As_2O_3$, $Sb_2O_3$, $SnO_2$, $CeO_2$, chloride, fluoride, nitrate and sulphate compounds. As is mentioned above, for safety and environmental reasons, it is preferred that the glass-ceramic material of the present invention is essentially free of $As_2O_3$, $Sb_2O_3$ as fining agents. Preferred fining agents in the glass-ceramic material of the present invention includes, about 0.3-1.2 wt % of $SnO_2$ and 0-1.0% of $CeO_2$. Generally, higher amount of $SnO_2$ can result in lower bubble count in the melted glass due to better fining effect. Moreover, and surprisingly, the use of $SnO_2$ instead of $As_2O_3$ tends to improve the whiteness of the material after ceramization. However, including $SnO_2$ at higher than about 1.2% by weight can result in undesirably high liquidus temperature of the glass, which means that the glass must be processed at higher temperature during forming.

The glass-ceramic material of the present invention contains 0-8% by weight $P_2O_5$, in certain embodiments from 0-6% by weight. The glass-ceramic material of the present invention contains 0-5% by weight $B_2O_3$, in certain embodiments 0-4% by weight, in certain other embodiments 1-4% by weight. The glasses for the glass-ceramic material of present invention can typically be melted at a temperature below 1600° C., in certain embodiments below about 1580° C., in certain other embodiments below about 1550° C., making it possible to melt in a relatively small commercial glass tank. The inclusion of $B_2O_3$ and $P_2O_5$ is conducive to the low melting temperature. Including $P_2O_5$ and $B_2O_3$ has several advantages. First, it helps in reducing the glass melting temperature. Second, it allows to increase the amount of $Na_2O$ and $K_2O$ without developing the grey-blue coloration explained below. In order to obtain a glass melting temperature of lower than 1600° C., it is desired that the glass comprises at least 1.5% by weight of $P_2O_5$ and $B_2O_3$ in total.

$Al_2O_3$ is used for the formation of the β-Spodumene major crystallographic phase. Then, a minimum amount of 18% is desired.

Including $Na_2O$ and $K_2O$ can reduce the melting temperature of the glass and shorten the ceramming cycle as well. However, higher amount of $Na_2O$ and $K_2O$ also leads to higher CTE of the glass-ceramic material upon ceramming. Moreover, including higher amounts of $Na_2O$ and $K_2O$ in the glass-ceramic imparts a deep grey-blue coloration of the material upon ceramming, which is undesirable in certain applications.

In order to obtain a CTE of the cerammed glass-ceramic material of the present invention of lower than about $30\times10^{-7}/°$ C., it is generally desired that the glass batch comprises less than about 11% by weight of $P_2O_5$, $B_2O_3$, $Na_2O$ and $K_2O$ in total, and less than about 3% by weight of $Na_2O$ and $K_2O$.

In order to obtain a relatively low CTE of the cerammed glass-ceramic material of the present invention of lower than about $25\times10^{-7}/°$ C., it is generally desired that the glass batch comprises less than about 9% by weight of $P_2O_5$, $B_2O_3$, $Na_2O$ and $K_2O$ in total, and less than about 2% by weight of $Na_2O$ and $K_2O$.

In order to obtain a relatively low CTE of the cerammed glass-ceramic material of the present invention of lower than about $20\times10^{-7}/°$ C., it is generally desired that the glass batch comprises less than about 7% by weight of $P_2O_5$, $B_2O_3$, $Na_2O$ and $K_2O$ in total, and less than about 1% by weight of $Na_2O$ and $K_2O$.

In order to obtain a lightness of the glass-ceramic, L*, higher than 89% with a short ceraming cycle, described below, it is highly desired that the ratio between the sum total of $Na_2O+K_2O$ by weight versus the sum total of $B_2O_3+P_2O_5$ by weight, i.e., $$\frac{Na_2O + K_2O}{B_2O_3 + P_2O_5},$$

be below about 0.5, in certain embodiments preferably below about 0.3.

Controlling the $Li_2O$ content between 3.3-4.1% in the glass batch is conducive to the formation of β-spodumene solid solution crystalline phase. $Li_2O$ also acts as fluxes to decrease the melting point of the glass, and improves the whiteness of the glass-ceramic. So, a minimum amount of 3.3% is needed. However, including $Li_2O$ at higher than about 4.1% by weight can result in undesirably high liquidus temperature of the glass. In certain embodiments of the glass-ceramic material of the present invention, it comprises about 3.5-4.1% of $Li_2O$.

If high transmission in IR and near IR of the glass-ceramic material of the present invention is desired, it is important that the batch materials are substantially free of IR absorbing components, such as FeO, CuO, etc. Therefore, low iron sand is preferred in the batch as a $SiO_2$ source in such cases. It is also desired that iron contamination during the glass melting process is avoided as much as possible for those applications. Typically, the iron content expressed in terms of parts per million by weight of $Fe_2O_3$ in the glass-ceramic material of the present invention should be controlled below 500 ppm for those applications. In reality, the iron present in the glass-ceramic material may be in +2 or +3 valency. It is desired that as much iron as possible is in +3 state. In applications for which IR and near IR transmission is not a significant concern, iron may be included in the glass batch and thus the final composition of the glass-ceramic material, such as when the glass-ceramic is to be used for the production of bowls for holding and dispensing foods. However, a total amount of iron below 900 ppm (parts per million) by weight is highly desired in order to obtain a lightness, L*, higher than 89%.

MgO and ZnO are fluxes for the composition. A minimum total amount of 3.5% by weight of MgO and ZnO is desired to obtain a glass melting temperature below 1600° C. MgO also improves the lightness of the glass-ceramic.

The amount of $TiO_2$ and $ZrO_2$ as nucleation agents in the glass can greatly affect the crystallization rate and the crystal grain size. Thus it is important to control their ranges to the ones described above. Knowing that the addition of $ZrO_2$ can increase the melting and liquidus temperatures, $TiO_2$ is preferable to $ZrO_2$.

In certain embodiments, the glass-ceramic material of the present invention comprises about 0-1% by weight of $CeO_2$. It allows to improve the whiteness of the material. However, if $CeO_2$ is included at higher than 1.0%, undesired coloration, such as a green yellowish coloration of the cerammed product may be generated. It has been found that when $CeO_2$ is used alone as the fining agent for the glass, in certain embodiments, the fining effect is less than desirable. Therefore, in certain embodiments, it is preferred that $SnO_2$ and $CeO_2$ are used in combination in the amounts specified above.

Usual colorants such as cobalt, chromium, vanadium, manganese, nickel and others, can be added to the composition to obtain a colored glass-ceramic.

Typically, the glass-ceramic material of the present invention comprises β-spodumene solid solution as the predominant crystalline phase. In certain embodiments, the volume of β-spodumene solid solution constitutes at least 85% of the total of the all the crystalline phases in the material. In order to obtain a low CTE of the glass-ceramic material of less than about $30 \times 10^{-7}/°C.$, it is generally desired that the glass-ceramic material comprises at least 85% by weight of low-expansion crystalline phases such as β-spodumene solid solution (predominant) or □eucryptite.

Typically, the glass-ceramic material of the present invention has a relatively low CTE between about 25-700° C. of $10-30 \times 10^{-7}/°C.$ In certain embodiments, the glass-ceramic material of the present invention has a CTE between about $10-25 \times 10^{-7}/°C.$ between about 25-700° C. In certain other embodiments, the glass-ceramic material of the present invention has a CTE between about $10-20 \times 10^{-7}/°C.$ between about 25-700° C.

The glass-ceramic articles of the present invention can be produced by a process comprising the following steps: (i) mixing raw materials in amounts such that upon melting thereof a glass is produced of a composition by weight of the total glass composition, comprising 55-68% $SiO_2$; 18-24% $Al_2O_3$; 3.3-4.1% $Li_2O$; 1.5-4.0% ZnO; 1.5-5.0% MgO; 2-5% $TiO_2$; 0-2% $ZrO_2$; 0-5% $B_2O_3$; 0-8% $P_2O_5$; 0-2% $Na_2O$, 0-2% $K_2O$; and at least one fining agent; (ii) melting and fining the mixture of raw materials of step (i) at a temperature typically below 1600° C.; (iii) forming the melted glass of step (ii) into glass articles; (iv) heating the glass articles to a nucleating temperature range $T_n$ between 600 and 850° C. for at least 15 minutes; (v) heating the glass articles to a ceramming temperature range $T_c$ between 900 and 1050° C.; (vi) maintaining the articles at the ceramming temperature for a period of time over 10 minutes; and (vii) cooling the glass ceramic articles to room temperature.

The temperature-temporal profile of steps (v) and (vi), in addition to the glass composition, determines the crystalline phases, their assemblage and grain sizes, hence the final quality, of the final glass-ceramic article of the present invention.

As mentioned above, in order to achieve good IR and, in particular, near IR transmission of the final glass-ceramic article where it is desired, it is required that the batch materials are substantially free of IR and near IR absorbing components. Thus, low iron content sand is preferred as a $SiO_2$ source. Prior acid treatment may be necessary to reduce the iron level of the sand and other batch materials. It is important to make sure that the treatment of the batch materials per se does not introduce iron oxides. Anhydrous boric acid may be used as the source of $B_2O_3$. Spodumene, fine alumina, and Al— metaphosphate may be used as the starting materials. In one embodiment of the present invention, the glass is fined by $As_2O_3$. It is preferred that the glass is oxidized. Nitrates may also oxidize the trace amount of $Fe^{2+}$ into $Fe^{3+}$ in the glass. Because IR absorption of iron oxide is caused by $Fe^{2+}$, but not by $Fe^{3+}$, the use of nitrate can improve the IR transmission property of the glass and glass-ceramic material of the present invention. One skilled in the art can calculate the amount of batch materials used according to the projected final composition of the glass-ceramic material. As mentioned above, the preferred fining agent is about 0.3-1.2% by weight of $SnO_2$. As mentioned above, in order to obtain better color of the glass-ceramic material, it is desired that in addition to $SnO_2$, about 0-1% by weight of $CeO_2$ is also used. It is surprising that $SnO_2$ can be used as the fining agent for the glass of the glass-ceramic material of the present invention without significantly affect the melting and processing thereof.

The mixed batch materials are then charged into a glass tank and melted according to conventional glass melting process. One skilled in the glass melting art can adjust the composition of the batch within the above described compositional range to fine tune the melting ease of the glass in order to accommodate the operating capacity and temperature of the glass melting tank. The molten glass can be homogenized and fined using conventional methods. Whilst some glasses having a melting temperature over 1600° C. can crystallize to form β-quartz and/or β-spodumene solid solution glass-ceramic material, such high temperature melting usually has to be carried out in expensive melting tanks with special design. In addition, the liquidus behavior of such high melting temperature glass usually requires higher temperature pressing and molding.

The homogenized, fined and thermally uniform molten glass is then formed into desired shapes. Various shaping may be used, such as casting, molding, pressing, rolling, floating, and the like. Generally, the glass should be formed at a viscosity lower than the liquidus viscosity (hence a temperature higher than the liquidus temperature). Take pressing for example. The glass is first delivered to high temperature molds and formed into glass articles with desired shape, surface texture and surface roughness by using a plunger. To obtain low surface roughness and a precise surface contour, precision plungers are required to press the glass gobs filled in the molds. It is also required that the plungers will not introduce IR absorbing oxides or other defects onto the surface of the glass article should high IR transmission is required. The moldings are then removed from the molds and transferred to a glass annealer to remove enough stress in the moldings for further processing where necessary and desirable. Thereafter, the cooled glass moldings are inspected, analyzed of chemical and physical properties for quality control purpose. Surface roughness and contour may be tested for compliance with product specification. Other conventional forming methods may be used by one of ordinary skill in the art mutatis mutandis.

To produce the glass-ceramic article of the present invention, the thus prepared glass articles are placed into a ceramming kiln to undergo the crystallization process. The temperature-temporal profile of the kiln is desirably program-controlled and optimized to ensure that the glass moldings and other glass articles, such as glass plates and the like, are formed into glass-ceramic articles having β-spodumene solid solution as the predominant crystalline phase. As described above, the glass composition and the thermal history during the ceramming process determine the final crystalline phases, their assemblage and crystallite sizes in the final product. Generally, the glass articles are first heated to a nucleation temperature range $T_n$ where crystal nuclei start to form. Subsequently, they are heated to an even higher maximum ceramming temperature $T_c$ to obtain β-spodumene crystallization. It is often desired to keep the articles at $T_c$ for a period of time so that crystallization reaches a desired extent. In order to obtain the glass-ceramic articles of the present invention, the nucleation temperature $T_n$ is between 600-850° C. and the maximum ceramming temperature $T_c$ is between 900-1050° C. After ceramming, the articles are allowed to exit the ceramming kiln and are cooled to room temperature. One skilled in the art can adjust $T_n$, $T_c$ and the temperature-temporal profile of the ceramming cycle to accommodate the different glass compositions within the above-described range. The glass-ceramic article of the present invention can advantageously exhibit an opaque or translucent white or colored aspect. It is desired that the glass-ceramic article has a lightness value higher than 89% under the CIELAB colorimetric system. In certain embodiments, an essentially opaque white color is preferred, having colorimetric values, a* and b*, under CIELAB system between −1.5 to 1.5.

It was found that a great advantage of the process of the present invention is that step (vi) may be completed in less than 1 hour to obtain the desired degree of crystallization. In certain embodiments step (vi) can be completed in less than 30 minutes. In certain other embodiments step (vi) can be completed in less than 20 minutes such as about 15 minutes. In general, the total of the duration of steps (iv), (v) and (vi) can be controlled to be shorter than 2 hours, in certain embodiments shorter than about 90 minutes, in certain other embodiments shorter than about 60 minutes. Therefore, the glass-ceramic article of the present invention can be produced at a relatively low temperature and during a relatively shorter period of time, leading to a high volume output, and improved economy.

The glass-ceramic article of the present invention may be further processed before its final intended use. Such post-processing includes, but is not limited to, surface coating or decoration with enamels.

For example, the glass-ceramic material may be employed as cooktop, countertop, and building materials, where its properties are called upon. To further summarize, the present invention has the following advantages:

The same glass fining (bubble) quality obtainable by $As_2O_3$-fining can be surprisingly obtained by $SnO_2$-fining. $SnO_2$ at the amount as used in the glass melting process and in the glass and glass-ceramic material is believed to be non-toxic for people and for the environment.

Appealing white color of the β-spodumene glass ceramic can be obtained by both $As_2O_3$-fining and $SnO_2$-fining. It is generally known that SnO is a powerful reducing agent and can generate colorations in the glasses—which it did not in the present invention. Moreover, the use of $SnO_2$ instead of $As_2O_3$ tends to improve the whiteness. The white color can be further improved by addition of $CeO_2$ to the glass. The product permits a level of lightness higher than 89% in the CIELAB calorimetric system.

The glass for the glass-ceramic of the present invention exhibits a viscosity of 300 poises at a temperature lower than 1600° C. that produces a glass ceramic with low thermal expansion after ceramming. Consequently, it can be melted below 1600° C. This reduced viscosity can be obtained with a limited use of additional fluxes, such as $Na_2O$, $K_2O$ or CaO, because addition of these flux could cause increase of the thermal expansion after ceramming.

A high ceramming speed for a high production volume: The different ceramming processes mentioned in the prior art use either a high crystallization temperature (higher than 1050° C.) and/or several hours for the crystallization treatment. These two conditions increase the cost of product and/or limit the productivity of the manufacturing process. In the present invention, the total ceramming cycle of the material we have developed, can be reduced to less than 90 minutes in total (including the duration of nucleating step, the duration of heating from the nucleating step to the ceramming step and the duration of the ceramming step) with a crystallization temperature below about 1050° C.

A viscosity at the liquidus higher than 2000 poises can be obtained in the present invention. This facilitates the forming of the precursor glass of the glass-ceramic article of the present invention. In certain embodiments, the composition does not comprise $ZrO_2$ in order to facilitate melting of the glass.

The following non-limiting examples further illustrate the present invention. However, it is to be understood that they are for the purpose of illustration only. Therefore, the present invention as claimed shall not be construed to be limited to these examples.

EXAMPLES

All the exemplary glasses listed in TABLES I and II below were melted with 1000 g total of raw materials introduced in a platinum crucible. The crucible was then placed in a furnace preheated at 1400° C. The following melting cycle was used:

120 min from 1400° C. to 1580° C.; and
300 min at 1580° C.

The glass was then rolled to a thickness of 4 mm, annealed 1 hour at 600° C. and cerammed in a static furnace with the following ceramming cycle:

glass sheets introduced into a furnace at 500° C.;
5 min to 660° C.;
40 min from 660° C. to 820° C.;
heating ramp from 820° C. to the crystallization temperature at 6°/min; and
15 min at crystallization temperature (between 930° C. and 1150° C.).

The crystallization temperature varied with the batch composition. For evaluating the fining effect of various fining agents, the number of seeds was counted in glasses after annealing. The following experiment demonstrates the interest of tin oxide as fining agent:

A same base glass composition was melted with different fining agents in batches A-F as indicated in TABLE I below to test the effectiveness of a series of fining agents. This base composition consisted of 20% $Al_2O_3$, 3.6% $Li_2O$, 4.3% $TiO_2$, 1.8% MgO, 2.2% ZnO, 4% $P_2O_5$, 2% $B_2O_3$ and balance $SiO_2$. The table below reports the number of seeds per $cm^3$ obtained for different fining elements. We estimate that all results lower than about 50 seeds by $cm^3$, obtained with laboratory processes, can allow to obtain a satisfactory quality in industrial conditions.

TABLE I

| Batch | Fining Agent | | Number of Seeds (/cm³) |
|---|---|---|---|
| | Agent | Amount (%) | |
| A | None | — | 882 |
| B | $As_2O_3$ | 0.8 | 7 |
| C | $Sb_2O_3$ | 1.6 | 3 |

TABLE I-continued

| Batch | Fining Agent Agent | Amount (%) | Number of Seeds (/cm³) |
|---|---|---|---|
| D | CeO$_2$ | 1 | 403 |
| E | SnO$_2$ | 0.5 | 32 |
| F | SnO$_2$ | 1 | 8 |

The different compositions mentioned in the prior art generally use As$_2$O$_3$ or Sb$_2$O$_3$ as fining agent. For the present invention, these tests clearly show that we obtained similar results by using SnO$_2$ as the fining agent. These results show also that cerium oxide alone is not efficient for desired fining effect. Physical properties have been measured before or after ceramming such as viscosity of the green glass, coefficient of thermal expansion and color of the cerammed materials. The main results are reported in the following TABLE II. Color is measured in reflection with illuminant D65-10° Observer. Devitrification is observed after 17 h of isothermal treatment. Crystals appear for viscosities higher than the maximum value of the viscosity range given into the following table. No crystal can be observed for a viscosity lower than the minimum value.

TABLE II

| | | Example No. | | | | | | | | |
|---|---|---|---|---|---|---|---|---|---|---|
| | | 1 | 2 | 3 | 4 | 5 | 6 | 7 | 8 | 9 |
| Composition (wt %) | | | | | | | | | | |
| SiO$_2$ (difference) | | 65.6 | 61.6 | 62.1 | 63.85 | 61.6 | 60.6 | 64.35 | 63.85 | 60.6 |
| Al$_2$O$_3$ | | 20 | 20 | 20 | 20 | 20 | 20 | 20 | 20 | 20 |
| Li$_2$O | | 3.6 | 3.6 | 4.1 | 3.85 | 3.6 | 3.6 | 3.85 | 3.85 | 3.6 |
| TiO$_2$ | | 4.3 | 4.3 | 4.3 | 4.3 | 2.6 | 4.3 | 4.3 | 4.3 | 4.3 |
| ZrO$_2$ | | 0 | 0 | 0 | 0 | 1.7 | 0 | 0 | 0 | 0 |
| MgO | | 1.8 | 1.8 | 1.8 | 2.3 | 1.8 | 1.8 | 2.8 | 4.5 | 1.8 |
| ZnO | | 2.2 | 2.2 | 2.2 | 2.2 | 2.2 | 2.2 | 2.2 | 0 | 2.2 |
| SnO$_2$ | | 0.5 | 0.5 | 0.5 | 0.5 | 0.5 | 1 | 0.5 | 0.5 | 0.5 |
| P$_2$O$_5$ | | 1 | 4 | 2 | 0 | 4 | 4 | 0 | 0 | 4 |
| B$_2$O$_3$ | | 1 | 2 | 3 | 3 | 2 | 2 | 2 | 3 | 2 |
| Na$_2$O | | 0 | 0 | 0 | 0 | 0 | 0 | 0 | 0 | 1 |
| K$_2$O | | 0 | 0 | 0 | 0 | 0 | 0 | 0 | 0 | 0 |
| CeO$_2$ | | 0 | 0 | 0 | 0 | 0 | 0.5 | 0 | 0 | 0 |
| Fe$_2$O$_3$ (ppm) | | ≈600 | ≈600 | ≈600 | ≈600 | ≈600 | ≈600 | ≈600 | ≈600 | ≈600 |
| Before Ceramming | | | | | | | | | | |
| Temp@300 poises (° C.) | | 1575 | 1540 | | | | <1540 | 1520 | | <1540 |
| Dev. Vis. (×10³ Poises) | | 6-8 | 5.5-9 | | | 4-7 | 2.5-3.5 | 5-7 | | |
| After Ceramming | | | | | | | | | | |
| Cryst. Temp. (° C.) | | 1050 | 960 | 960 | 990 | 1020 | 930 | 990 | 960 | 960 |
| CTE (25-700° C.) (×10⁻⁷/° C.) | | <13 | 15.9 | 17.2 | 15.5 | 14 | 16.4 | 14.9 | <18 | 20.5 |
| Color | L* | 91.2 | 93.1 | 92.7 | 92.61 | 92 | 92.9 | 91.4 | 93.0 | 92.35 |
| | a* | −0.56 | −0.25 | −0.1 | −0.27 | | −0.23 | −0.35 | 0.4 | −0.7 |
| | b* | −0.27 | 0.66 | 0.69 | 0.61 | | 0.37 | 0.44 | 1.7 | 0.5 |

| | | Example No. | | | | | | | |
|---|---|---|---|---|---|---|---|---|---|
| | | 10 | 11 | 12 | 13 | 14 | 15 | 16 | 17 |
| Composition (wt %) | | | | | | | | | |
| SiO$_2$ (difference) | | 59.6 | 59.6 | 57.6 | 64.6 | 55.6 | 65 | 69 | 65.6 |
| Al$_2$O$_3$ | | 20 | 20 | 20 | 20 | 20 | 22.55 | 20 | 20 |
| Li$_2$O | | 3.6 | 3.6 | 3.6 | 4.1 | 3.6 | 3.73 | 3.45 | 3.6 |
| TiO$_2$ | | 4.3 | 4.3 | 4.3 | 4.3 | 4.3 | 2.8 | 2.6 | 4.3 |
| ZrO$_2$ | | 0 | 0 | 0 | 0 | 0 | 1.55 | 1.7 | 0 |
| MgO | | 1.8 | 1.8 | 1.8 | 1.8 | 1.8 | 1.3 | 1.2 | 1.8 |
| ZnO | | 2.2 | 2.2 | 2.2 | 2.2 | 2.2 | 0 | 1.7 | 2.2 |
| SnO$_2$ | | 0.5 | 0.5 | 0.5 | 0.5 | 0.5 | 0 | 0 | 0.5 |
| P$_2$O$_5$ | | 4 | 4 | 8 | 1 | 8 | 1.35 | 0 | 0 |
| B$_2$O$_3$ | | 4 | 2 | 2 | 1 | 4 | 0 | 0 | 2 |
| Na$_2$O | | 0 | 1 | 0 | 1 | 0 | 0.5 | 0.2 | 0 |
| K$_2$O | | 0 | 1 | 0 | 0 | 0 | 0.75 | 0.2 | 0 |
| CeO$_2$ | | 0 | 0 | 0 | 0 | 0 | 0 | 0 | 0 |
| BaO | | | | | | | | 0.8 | 0 |
| Fe$_2$O$_3$ (ppm) | | ≈600 | ≈600 | ≈600 | ≈600 | ≈600 | ≈600 | ≈600 | ≈3000 |
| Before Ceramming | | | | | | | | | |
| Temp@300 poises (° C.) | | 1520 | <1540 | 1540 | | 1495 | 1615 | 1640 | |
| Dev. Vis. (×10³ Poises) | | 4-6 | | | | | ≈10 | ≈5 | |

TABLE II-continued

| After Ceramming | | | | | | | | | |
|---|---|---|---|---|---|---|---|---|---|
| Cryst. Temp. (° C.) - Cryst. Time (min) | | 930 | 990 | 910 | 990 | 890 | 1150 - 120 | 1070 - 120 | 990 |
| CTE (25-700° C.) (×10$^{-7}$/° C.) | | 22.7 | 27.3 | 27.2 | | 31.3 | 14.1 | 9 | |
| Color | L* | 93.3 | 90.6 | 92.5 | 82.4 | 92.8 | 93.7 | 88.4 | 66.6 |
| | a* | −0.38 | −0.9 | −0.4 | −1.1 | −0.7 | 0.18 | 0.0 | −0.85 |
| | b* | 0.18 | −1.3 | 0.3 | −5.6 | 0.2 | 2.7 | 0.26 | −9.97 |

Examples 1 to 12 belong to the invention. They display a low viscosity (300 poise at a temperature below 1600° C.). Despite this low viscosity, the viscosity at the liquidus stays high enough to have adequate forming behavior.

The maximum temperature of ceramming is up to 1050° C. Ceramming times are lower than 90 min and expansions are lower than $30 \times 10^{-7} K^{-1}$.

Examples 13 to 17 do not belong to the invention. The present inventors have found that:

It is desired that the sum total of $P_2O_5+B_2O_3+Na_2O+K_2O$ be lower than about 11% by weight. Example 14 indicates that a total of $[P_2O_5+B_2O_3+Na_2O+K_2O]$ higher than 11% tends to generate a material after ceramming with a CTE higher than $30 \times 10^{-7}/°$ K.; Moreover, it is also desired that the total of $Na_2O+K_2O$ is less than about 3% by weight. It is further preferred that the total of $P_2O_5+B_2O_3+Na_2O+K_2O$ be less than about 9%, and a total of $Na_2O+K_2O$ less than about 2% by weight. It is even more preferred that the total of $P_2O_5+B_2O_3+Na_2O+K_2O$ be less than about 9%, and a total of $Na_2O+K_2O$ less than about 2% by weight, as indicated supra, in order to obtain low CTE in the final glass-ceramic material.

It is desired that the sum total of $P_2O_5+B_2O_3$ be higher than about 1.5% by weight. Examples 15 and 16 indicate that a sum total of $P_2O_5+B_2O_3$ less than 1.5% by weight tends to lead to a glass melting point of higher than about 1600° C.;

It is desired the ratio of the sum total of $Na_2O+K_2O$ to the sum total of $P_2O_5+B_2O_3$, i.e., $$\frac{Na_2O+K_2O}{B_2O_3+P_2O_5},$$

be lower than 0.5. Example 13 indicates the ratio if higher than or equal to about 0.5 can lead to lightness of lower than 89%.

It is desired that the amount of $Fe_2O_3$ be lower than about 900 ppm. An $Fe_2O_3$ amount higher than that tends to lead to a lightness lower than about 89%, as suggested by Example 17.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A glass-ceramic material having β-spodumene solid solution as the predominant crystalline phase, a CTE from about 25 to about 700° C. of about $10\text{-}30 \times 10^{-7}/°$ C., and a composition, by weight of the total composition, comprising:

55-68% $SiO_2$;
18-24% $Al_2O_3$;
3.3-4.1% $Li_2O$;
1.5-4.0% $ZnO$;
1.5-5.0% $MgO$;
2-5% $TiO_2$;
0-2% $ZrO_2$;
0-5% $B_2O_3$;
0-8% $P_2O_5$;
0-2% $Na_2O$,
0-2% $K_2O$;
0-0.1% $As_2O_3$;
0-0.1% $Sb_2O_3$; and
components resulting from effective amount of at least one fining agent, wherein:
the total of $B_2O_3$ and $P_2O_5$ is at least 1.5% by weight,
the total of MgO and ZnO is at least about 3.5% by weight,
the total of $Na_2O$ and $K_2O$ is less than about 3.0% by weight,
the total of $P_2O_5$, $B_2O_3$, $Na_2O$ and $K_2O$ is less than about 11% by weight,
the weight ratio of the sum total of $Na_2O+K_2O$ to the sum total of $P_2O_5+B_2O_3$ $$\left(\frac{Na_2O+K_2O}{B_2O_3+P_2O_5}\right)$$

is less than about 0.5.

2. A glass-ceramic material according to claim 1 having a composition wherein the total of $P_2O_5$, $B_2O_3$, $Na_2O$ and $K_2O$ is less than about 9% by weight and the total of $Na_2O$ and $K_2O$ is less than about 2% by weight.

3. A glass-ceramic material according to claim 1 having a composition wherein the total of $P_2O_5$, $B_2O_3$, $Na_2O$ and $K_2O$ is less than about 7% by weight and the total of $Na_2O$ and $K_2O$ is less than about 1% by weight.

4. A glass-ceramic material according to claim 1 comprising 0.3-1.2% $SnO_2$ and 0-1% $CeO_2$ as fining agent.

5. A glass-ceramic material according to claim 1, which is opaque and essentially white.

6. A glass-ceramic material according to claim 1, comprising a total of $P_2O_5$ and $B_2O_3$ higher than or equal to about 2% by weight.

7. A glass-ceramic material according to claim 1, comprising $Fe_2O_3$ in the amounts of less than about 900 ppm by weight, advantageously less than about 500 ppm.

8. A glass-ceramic material according to claim 1, comprising more than 85% of β-spodumene and β-quartz solid solutions among all crystalline phases present in the material.

9. A glass-ceramic material according to claim 1, comprising about 3.5-4.1% by weight of $Li_2O$.

10. A glass-ceramic article made of glass-ceramic material according to claim 1.

11. A glass-ceramic article according to claim 10 which is a cooktop plate or a cook utensil.

12. A process for making a glass-ceramic article, comprising the following steps:
(i) mixing raw materials in amounts such that upon melting thereof a glass is produced of a composition by weight of the total glass composition, comprising 55-66% $SiO_2$; 18-22% $Al_2O_3$; 3.5-4.1% $Li_2O$; 1.8-3.2% ZnO; 1.5-3.0% MgO; 2-5% $TiO_2$; 0-2% $ZrO_2$; 0-4% $B_2O_3$; 0-8% $P_2O_5$; 0-2% $Na_2O$, 0-2% $K_2O$, 0-0.1% $As_2O_3$, 0-0.1 $Sb_2O_3$; and at least one fining agent; wherein: the total of $B_2O_3$ and $P_2O_5$ is at least 1.5% by weight, the total of MgO and ZnO is at least about 3.5% by weight, the total of $Na_2O$ and $K_2O$ is less than about 3.0% by weight, the total of $P_2O_5$, $B_2O_3$, $Na_2O$ and $K_2O$ is less than about 11% by weight, the weight ratio of the sum total of $Na_2O+K_2O$ to the sum total of $P_2O_5+B_2O_3$ $$\left(\frac{Na_2O + K_2O}{B_2O_3 + P_2O_5}\right)$$

is less than about 0.5;
(ii) melting the mixture of raw materials of step (i) at a temperature below about 1600° C. into melted glass followed by fining and homogenization thereof;
(iii) forming the melted glass of step (ii) into glass article;
(iv) heating the glass article to a nucleating temperature range between 600 and 850° C. for at least 15 minutes;
(v) heating the article to a ceramming temperature $T_c$ between 900 and 1050° C.;
(vi) maintaining the glass article at the ceramming temperature for a period of time over 10 minutes; and
(vii) cooling the article to room temperature;

whereby a glass-ceramic article comprising β-spodumene solid solution as the predominant crystalline phase and having a CTE from about 25 to about 700° C. of about 10-30× $10^{-7}$/°C. is produced.

13. A process according to claim 12, wherein in step (i), the amount of the raw materials is chosen such that upon melting, the composition of the glass has a total of $P_2O_5$, $B_2O_3$, $Na_2O$ and $K_2O$ less than about 9% by weight and a total of $Na_2O$ ad $K_2O$ less than about 2% by weight.

14. A process according to claim 12, wherein in step (i), the amount of the raw materials is chosen such that upon melting, the composition of the glass has a total of $P_2O_5$, $B_2O_3$, $Na_2O$ and $K_2O$ less than about 7% by weight and a total of $Na_2O$ ad $K_2O$ less than about 1% by weight.

15. A process according to claim 12, wherein in step (ii), the mixture of the raw materials is melted at a temperature up to about 1550° C.

16. A process according to claim 12, wherein in step (i), the raw materials mixed are such that the final melted glass comprises about 0.3-1.2% by weight of $SnO_2$ and 0-1% $CeO_2$ of the final total composition of the melted glass.

17. A process according to claim 12, wherein in step (i), the raw materials mixed are such that the melted glass comprises a total of $B_2O_3$ and $P_2O_5$ of higher than or equal to about 2% by weight of the final total composition.

18. A process according to claim 12, wherein in step (v), the temperature $T_c$ is between about 930-1050° C.

19. A process according to claim 12, wherein the duration of step (vi) is less than 1 hour.

20. A process according to claim 12, wherein the total of duration of steps (iv), (v) and (vi) is shorter than 2 hours, advantageously shorter than 90 minutes.

* * * * *